(12) United States Patent
Pelzer (10) Patent No.: US 9,050,869 B1
(45) Date of Patent: Jun. 9, 2015

(54) TORQUE REVERSING SUSPENSION SYSTEM

(71) Applicant: Derrick Pelzer, Santee, SC (US)

(72) Inventor: Derrick Pelzer, Santee, SC (US)

( * ) Notice: Subject to any disclaimer, the term of this patent is extended or adjusted under 35 U.S.C. 154(b) by 0 days.

(21) Appl. No.: 14/193,779

(22) Filed: Feb. 28, 2014

Related U.S. Application Data (63) Continuation-in-part of application No. 13/561,371, filed on Jul. 30, 2012, now abandoned, which is a continuation-in-part of application No. 12/826,527, filed on Jun. 29, 2010, now abandoned.

(51) Int. Cl.
| | |
|---|---|
| B60G 9/02 | (2006.01) |
| B60G 3/12 | (2006.01) |
| B62D 21/11 | (2006.01) |
| B62D 21/18 | (2006.01) |
| B60G 5/02 | (2006.01) |

(52) U.S. Cl.
CPC .......................................... *B60G 5/02* (2013.01)

(58) Field of Classification Search
USPC .................... 180/312; 280/124.104, 124.116, 280/124.128
See application file for complete search history.

(56) References Cited

U.S. PATENT DOCUMENTS

| | | | |
|---|---|---|---|
| 4,341,397 A | 7/1982 | Morimura et al. | |
| 4,469,188 A | 9/1984 | Mita | |
| 4,540,061 A | 9/1985 | Watanabe | |
| 5,513,868 A | 5/1996 | Barr | |
| 5,645,292 A | 7/1997 | McWilliams et al. | |
| 5,707,072 A | 1/1998 | Hopper | |
| 5,746,275 A | 5/1998 | Cross et al. | |
| 5,845,918 A | 12/1998 | Grinde et al. | |
| 6,042,131 A | 3/2000 | Bailey | |
| 6,095,275 A | 8/2000 | Shaw | |
| 6,164,673 A | 12/2000 | Matsura | |
| 6,446,748 B1 | 9/2002 | Suzuki | |
| 6,547,027 B1 | 4/2003 | Kalhok et al. | |
| 6,581,716 B1 | 6/2003 | Matsuura | |
| 6,675,926 B2 | 1/2004 | Montague | |
| 6,752,447 B2 | 6/2004 | Gagne | |
| 6,786,526 B1 | 9/2004 | Blalock | |
| 6,851,691 B2 | 2/2005 | Rasidescu et al. | |
| 6,860,353 B2 | 3/2005 | Miyashiro | |
| D538,200 S | 3/2007 | Yin et al. | |
| 7,255,191 B2 | 8/2007 | Baldwin et al. | |

(Continued)

OTHER PUBLICATIONS

ATV Shadow Drone YouTube screen capture. Retrieved Oct. 31, 2013. Posted Feb. 8, 2009. URL:<http://www.youtube.com/watch?v=hn5P4RQ05z4>.

*Primary Examiner* — Paul N Dickson
*Assistant Examiner* — Barry Gooden, Jr.

(57) ABSTRACT

A torque reversing suspension system for improved traction and steering control for all-terrain vehicles features an all-terrain vehicle upper frame having an all-terrain vehicle front steering and suspension system located at an upper frame anterior end. An all-terrain vehicle engine and transmission are located at an upper frame middle. An all-terrain vehicle seat is located on an upper frame top close to the upper frame middle. A single all-terrain vehicle lower frame swing arm is pivotally located on the upper frame. A rear axle is operatively connected to the engine and transmission via a chain and sprockets. A rear wheel having a rear tire located thereon is located on the rear axle. A mono-shock is located between an upper frame posterior end midpoint and a lower frame posterior end midpoint. The mono-shock is located at an angle in a Sagittal plane from 30 degrees to 75 degrees.

4 Claims, 8 Drawing Sheets

(56) References Cited

U.S. PATENT DOCUMENTS

| | | |
|---|---|---|
| 7,445,070 B1 | 11/2008 | Pickering |
| 7,658,411 B2 | 2/2010 | Davis et al. |
| 7,806,215 B2 | 10/2010 | Codere et al. |
| 7,954,853 B2 | 6/2011 | Davis et al. |
| 8,602,428 B2 * | 12/2013 | Swist ............... 280/124.136 |
| 2003/0136613 A1 | 7/2003 | Seki |
| 2003/0221890 A1 | 12/2003 | Fecteau et al. |
| 2003/0221891 A1 | 12/2003 | Fecteau et al. |
| 2004/0035624 A1 | 2/2004 | Fecteau et al. |
| 2005/0006169 A1 | 1/2005 | Michisaka et al. |
| 2005/0217909 A1 | 10/2005 | Guay et al. |
| 2006/0113743 A1 | 6/2006 | Bryant |
| 2006/0197331 A1 | 9/2006 | Davis et al. |
| 2007/0120303 A1 | 5/2007 | Rhein |
| 2008/0073868 A1 | 3/2008 | Weagle |
| 2008/0217081 A1 | 9/2008 | Maltais et al. |
| 2008/0277184 A1 | 11/2008 | Marleau |
| 2012/0256388 A1 * | 10/2012 | Swist ............... 280/124.136 |

\* cited by examiner

TORQUE REVERSING SUSPENSION SYSTEM

CROSS REFERENCE

This application claims priority to U.S. non-provisional application Ser. No. 13/561,371 filed Jul. 30, 2012 as a continuation-in-part, and to U.S. non-provisional application Ser. No. 12/826,527 filed Jun. 29, 2010, the specification(s) of which is/are incorporated herein in their entirety by reference.

FIELD OF THE INVENTION

The present invention relates to all-terrain vehicle suspension systems.

BACKGROUND OF THE INVENTION

Traditional all-terrain vehicles (ATVs) are prone to excessive bouncing of the rider and tipping on rough terrain or steep hills. In addition, upon activation of heavy throttle or when pulling a heavy load, the front wheels are easily pulled from contact with a ground surface. The present invention features a novel, adjustable location and positioning of the monoshock resulting in a unique mounting angle of the monoshock. An all-terrain vehicle employing the torque reversing suspension system of the present invention allows for surprising ability to prevent lifting of the front wheel of the all-terrain vehicle, resulting in improved traction and steering control during operation.

PRIOR ART

U.S. Patent Publication Number 2003/0136613, Seki, Brake Device for Vehicle, discloses a four-wheel independent suspension system only, rather than the solid rear axle located on a single lower frame swing arm taught in the present invention. FIGS. 7-10 of the Seki Patent Publication clearly illustrate this four-wheel independent suspension system embodiment. Paragraphs [0033]-[0035] of the Seki invention teach a four-wheel independent suspension system only.

RESEARCH AND DEVELOPMENT

Regarding asserted public disclosure of the invention in a video uploaded to the internet (NOTE: only a single video was cited URL: http:/www.youtube.com/watch?v=5HUfAL7ilCg), applicant was CLEARLY experimenting while in public view by looking to identify features whereupon improvements and modifications can be made to the invention. It is well known by one of ordinary skill in the art, that uploading a video to the internet is a way to conveniently store a file and provide a means for the inventor to observe his testing from a remote platform. Simply by viewing this video, it is quite easy to ascertain the experimental nature of the video: The video documents the testing of the present invention during operation from numerous angles that provides the inventor with the ability to scrutinize performance the present invention at a later time, while he, himself pilots the vehicle. Not all tests result in changes that are an actual reduction to practice. Many times, experimental tests confirm existing results.

Regardless of the presence of an internet video, novel features that are undisclosed include the following: a first mono-shock is disposed at an angle in a Sagittal plane from 30 degrees to 75 degrees, a second mono-shock is disposed at an angle in a Sagittal plane from 30 degrees to 90 degrees, and the first mono-shock and the second mono-shock are disposed opposed to one another on each side of a vertical plane. Additionally, including this novel suspension system of three-wheeled and two-wheeled all-terrain vehicles in addition to four-wheeled all-terrain vehicles is clearly unique. None of the prior art (said video included) teaches a first mono-shock and a second mono-shock mounted opposed to one another in the said angles. The above mentioned first mono-shock mounted at the specified angle at the specified location acts to prevent lifting of the front tire for improved traction and steering control for the all-terrain vehicle upon operation. The second mono-shock mounted at the specified angle at the specified location provides additional support for carrying a passenger.

Inventor wishes to reassert the affidavit remark reciting that the presence of an internet video "in no way suggests commercial availability of the invention." Although a prototype under development is indeed demonstrated in the video, no contact information, order form, technical specifications, or ordering website is made available. CLEARLY, with the inventor merely making a passing reference to what could be considered an intended goal of every new invention with respect to future marketability, he by no means suggests current commercialization of the product.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a torque reversing suspension system for improved traction and steering control for all-terrain vehicles. In some embodiments, the system comprises an all-terrain vehicle upper frame. In some embodiments, an all-terrain vehicle front steering and suspension system is located at an upper frame anterior end. In some embodiments, an all-terrain vehicle engine and transmission are located at an upper frame middle. In some embodiments, an all-terrain vehicle seat is located on an upper frame top close to the upper frame middle.

In some embodiments, the system comprises a single all-terrain vehicle lower frame swing arm. In some embodiments, a lower frame anterior end is pivotally located on an upper frame bottom posterior to an upper frame middle. In some embodiments, the system comprises a rear axle. In some embodiments, the rear axle is operatively connected to the engine and transmission via a chain and sprockets. In some embodiments, a rear wheel having a rear tire located thereon is located on the rear axle.

In some embodiments, the system comprises a mono-shock. In some embodiments, a mono-shock first end is located at an upper frame posterior end midpoint. In some embodiments, a mono-shock second end is located at a lower frame posterior end midpoint. In some embodiments, the mono-shock is located at an angle in a Sagittal plane from 30 degrees to 75 degrees with respect to a Plane B that is parallel with a ground surface. In some embodiments, the location of the mono-shock first end and the mounting angle of the mono-shock of the torque reversing suspension system prevents lifting of the front tire for improved traction and steering control for the all-terrain vehicle upon operation.

DESCRIPTION OF PREFERRED EMBODIMENTS

Following is a list of elements corresponding to a particular element referred to herein:
100 Torque reversing suspension system
200 Upper frame
210 Upper frame top
220 Upper frame bottom
230 Upper frame first side
240 Upper frame second side
250 Upper frame anterior end
252 Upper frame anterior end midpoint
260 Upper frame middle
270 Upper frame posterior end
272 Upper frame posterior end midpoint
280 Front steering and suspension system
290 Engine and transmission
300 Seat
310 Chain
320 Sprocket
330 Wheel
340 Tire
400 Lower frame swing arm
410 Lower frame top
420 Lower frame bottom
430 Lower frame first side
440 Lower frame second side
450 Lower frame anterior end
460 Lower frame posterior end
462 Lower frame posterior end midpoint
500 Plane A
510 Plane B
520 Plane C
530 Plane D
600 Rear axle
610 Rear axle midpoint
620 Rear axle first side
630 Rear axle second side
700 Mono-shock
710 Mono-shock first end
720 Mono-shock second end Referring now to FIG. 1-13, the present invention features a torque reversing suspension system (100) for improved traction and steering control for all-terrain vehicles. In some embodiments, said system (100) comprises an all-terrain vehicle upper frame (200) having an upper frame top (210), an upper frame bottom (220), an upper frame first side (230), an upper frame second side (240), an upper frame anterior end (250), an upper frame middle (260), and an upper frame posterior end (270). In some embodiments, the upper frame middle (260) is located between the upper frame anterior end (250) and the upper frame posterior end (270). In some embodiments, an all-terrain vehicle front steering and suspension system (280) is located at the upper frame anterior end (250). In some embodiments, an all-terrain vehicle engine and transmission (290) are located at the upper frame middle (260). In some embodiments, an all-terrain vehicle seat (300) is located on the upper frame top (210) close to the upper frame middle (260).

In some embodiments, said system (100) comprises a single all-terrain vehicle lower frame swing arm (400) having a lower frame top (410), a lower frame bottom (420), a lower frame first side (430), a lower frame second side (440), a lower frame anterior end (450), and a lower frame posterior end (460). In some embodiments, the lower frame anterior end (450) is pivotally located on the upper frame bottom (220) posterior to the upper frame middle (260). In some embodiments, the vehicle lower frame swing arm (400) travels in a vertical plane, Plane A (500).

In some embodiments, said Plane A (500) lies on an upper frame anterior end midpoint (252) and an upper frame posterior end midpoint (272). In some embodiments, the upper frame anterior end midpoint (252) is located between the upper frame first side (230) and the upper frame second side (240) on the upper frame anterior end (250). In some embodiments, the upper frame posterior end midpoint (272) is located between the upper frame first side (230) and the upper frame second side (240) on the upper frame posterior end (270).

In some embodiments, the system (100) comprises a rear axle (600) having a rear axle midpoint (610) located at a lower frame posterior end midpoint (462). In some embodiments, the lower frame posterior end midpoint (462) is located between the lower frame first side (430) and the lower frame second side (440) on the lower frame posterior end (460). In some embodiments, the rear axle midpoint (610) is located between a rear axle first side (620) and a rear axle second side (630). In some embodiments, the rear axle (600) is operatively connected to the engine and transmission (290) via a chain (310) and sprockets (320). In some embodiments, a rear wheel (330) having a rear tire (340) located thereon is located on the rear axle (600). In some embodiments, the rear axle (600) travels in said Plane A (500).

In some embodiments, the system (100) comprises a mono-shock (700) having a mono-shock first end (710) and a mono-shock second end (720).

In some embodiments, the mono-shock first end (710) is located at the upper frame posterior end midpoint (272). In some embodiments, the mono-shock second end (720) is located the lower frame posterior end midpoint (462). In some embodiments, the lower frame posterior end midpoint (462) is located between the lower frame first side (430) and the lower frame second side (440) at the lower frame posterior end (460). In some embodiments, the mono-shock (700) lies in said Plane A (500).

In some embodiments, a horizontal plane, Plane B (510), is horizontally located and intersects a front wheel center, and a rear wheel center. In some embodiments, a vertical plane, Plane C (520), is vertically perpendicularly located with respect to said Plane B (510). In some embodiments, said Plane C (520) intersects a rear-most tangent of the rear tire (340). In some embodiments, said Plane A (500) is perpendicular to said Plane B (510) and said Plane C (520). In some embodiments, the upper frame posterior end (270) is located at or posterior to said Plane C (520).

In some embodiments, the mono-shock (700) is located at an angle in a Sagittal plane from 30 degrees to 75 degrees with respect to said Plane B (510). In some embodiments, the location of the mono-shock first end (710) and the mounting angle of the mono-shock (700) of the torque reversing suspension system (100) prevents lifting of the front tire (340) for improved traction and steering control for the all-terrain vehicle upon operation.

In some embodiments, the system (100) is located on a four-wheeled all-terrain vehicle, or what is commonly known as a quad, or a four-wheeler.

In some embodiments, the system (100) is located on a three-wheeled all-terrain vehicle, or what is commonly known as a three-wheeler or a trike.

In some embodiments, the system (100) is located on a two-wheeled all-terrain vehicle, an off-road motorcycle, or a dirtbike.

In some embodiments, a vertical plane, Plane D (530), is vertically perpendicularly located with respect to said Plane B (510). In some embodiments, said Plane D (530) intersects a rear-most tangent of the rear wheel (330). In some embodiments, said Plane A (500) is perpendicular to said Plane B (510) and said Plane D (520). In some embodiments, the upper frame posterior end (270) is located between said Plane C (520) and said Plane D (530).

In some embodiments, the mono-shock (700) is located at an angle in a Sagittal plane from 30 degrees to 45 degrees with respect to said Plane B (510).

In some embodiments, the mono-shock (700) is located at an angle in a Sagittal plane from 45 degrees to 60 degrees with respect to said Plane B (510).

In some embodiments, the mono-shock (700) is located at an angle in a Sagittal plane from 60 degrees to 75 degrees with respect to said Plane B (510).

In some embodiments, Plane B (510) is parallel to a level ground surface.

Figure 1:
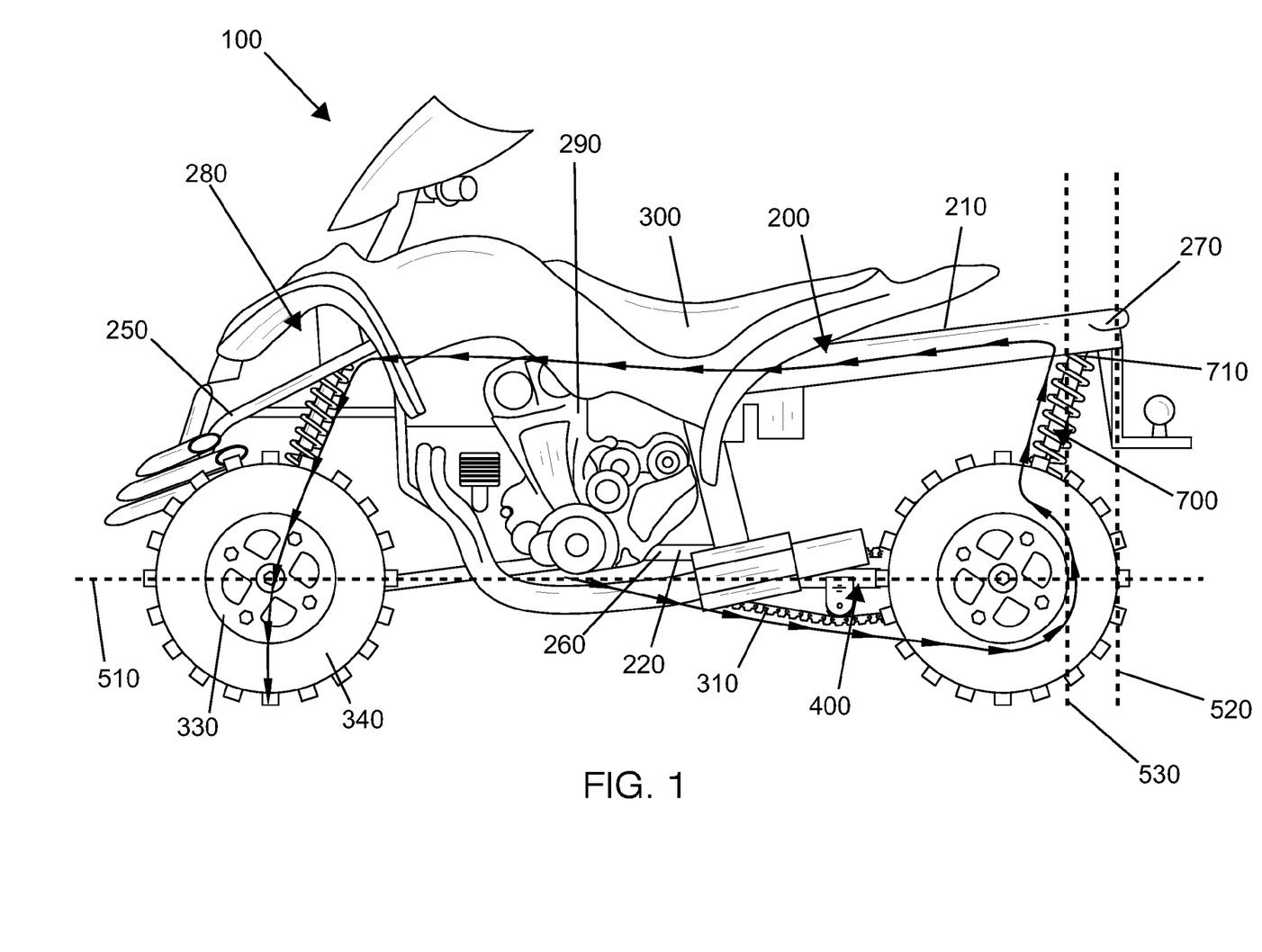
FIG. 1 is a side view of the present invention on a four-wheeled all-terrain vehicle.
Figure 2:
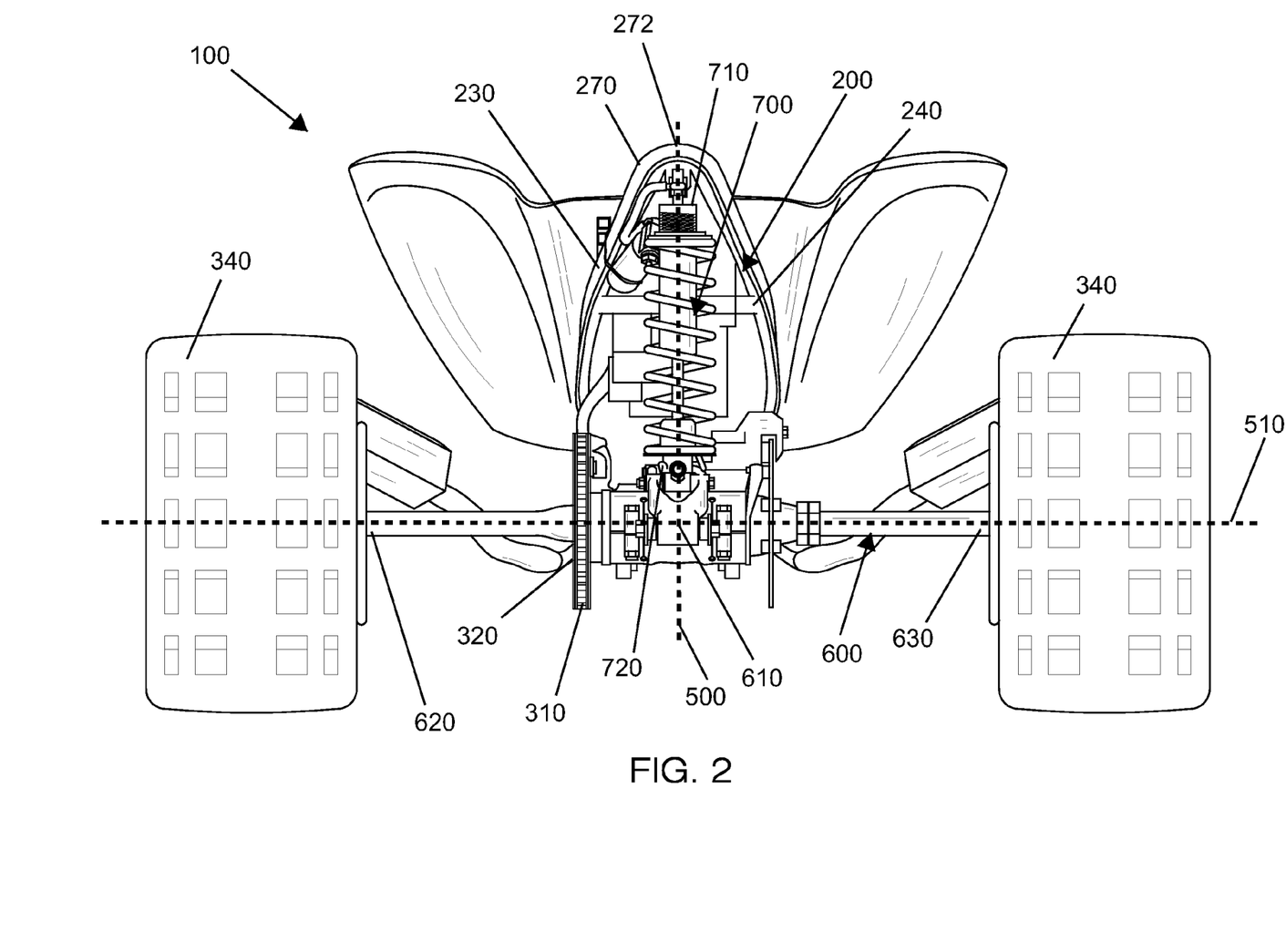
FIG. 2 is a rear view of the present invention on a four-wheeled all-terrain vehicle.
Figure 3:
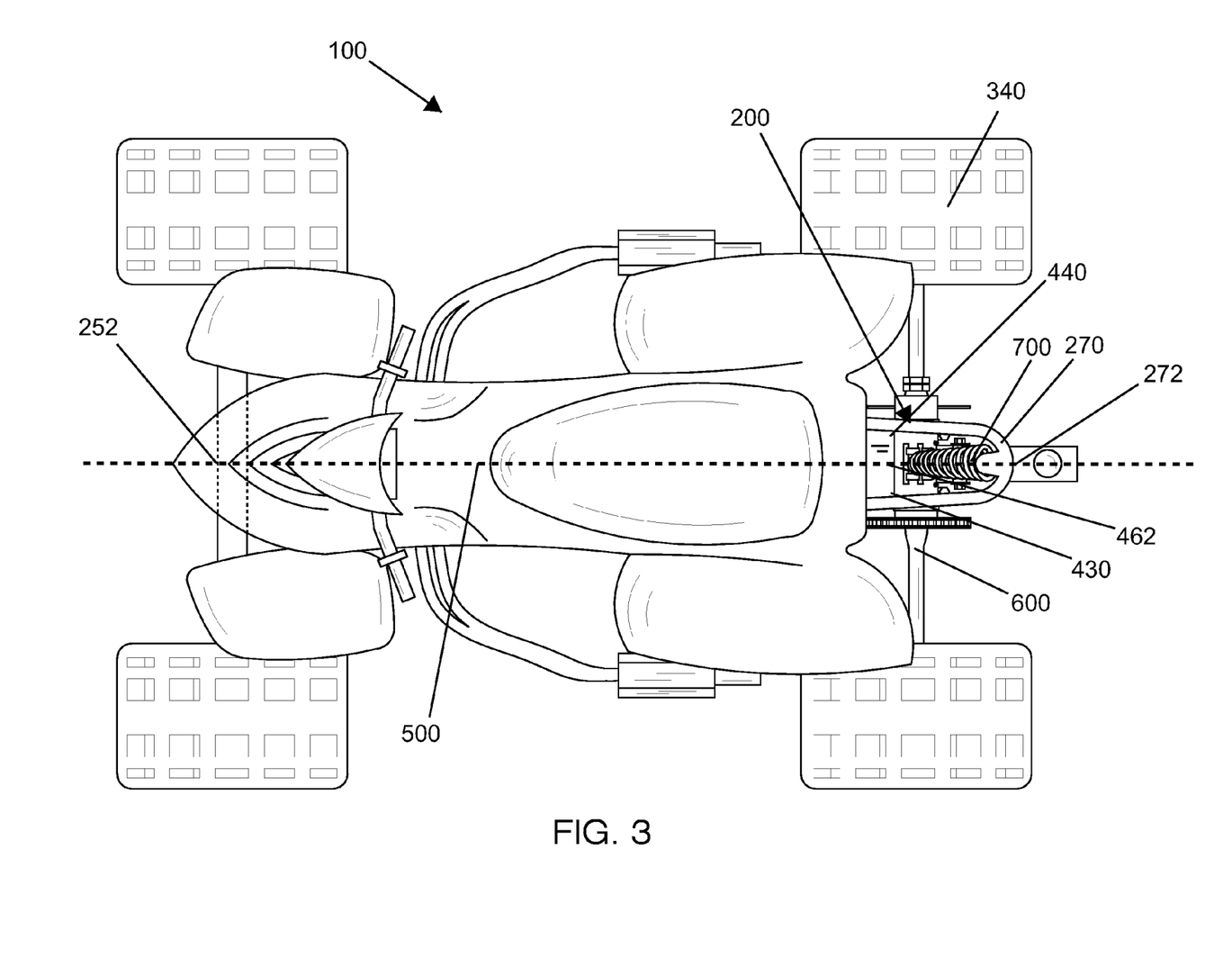
FIG. 3 is a top view of the present invention on a four-wheeled all-terrain vehicle.
Figure 4:
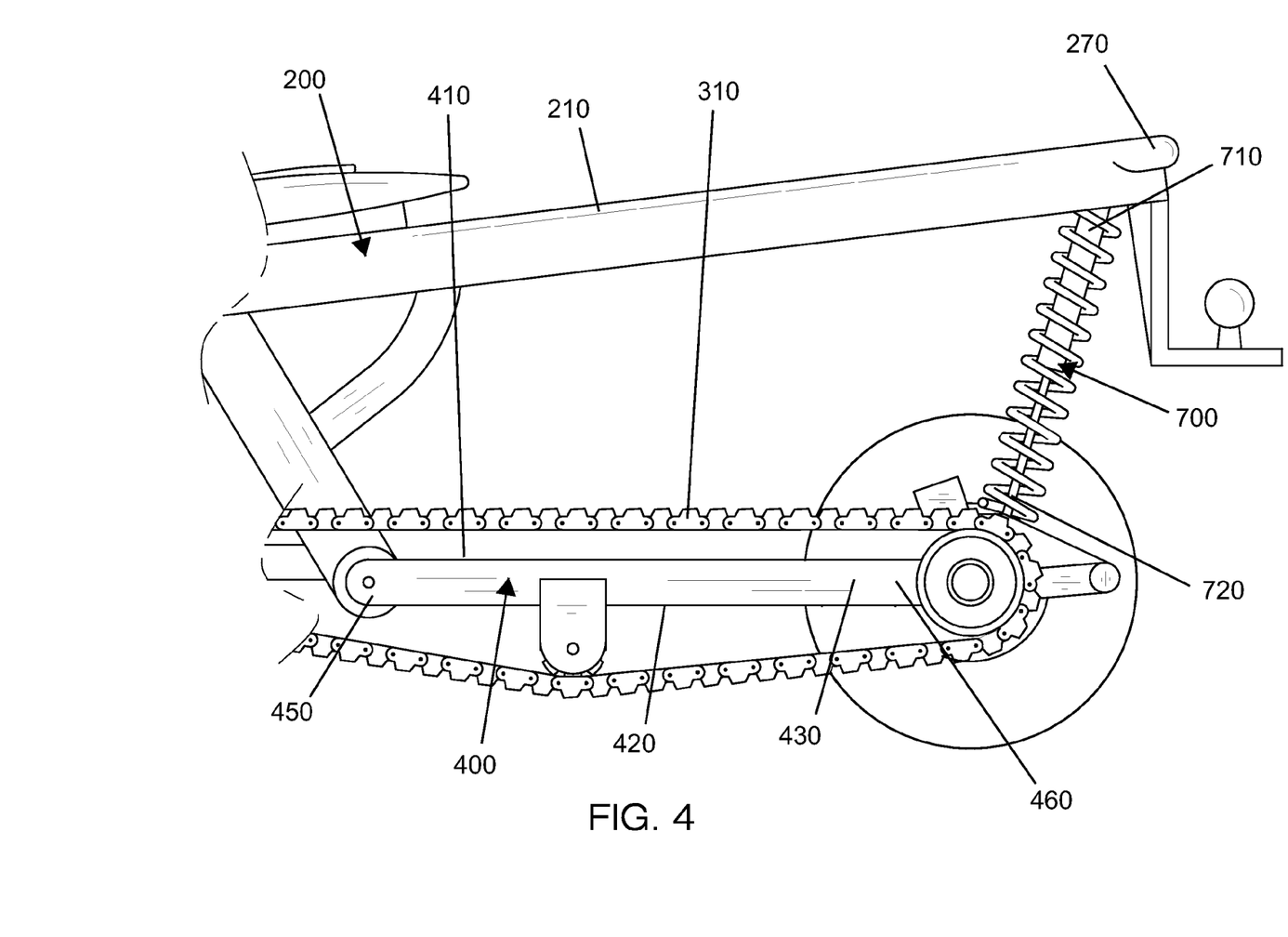
FIG. 4 is a side view of the lower frame swing arm of the present invention.
Figures 5, 6:
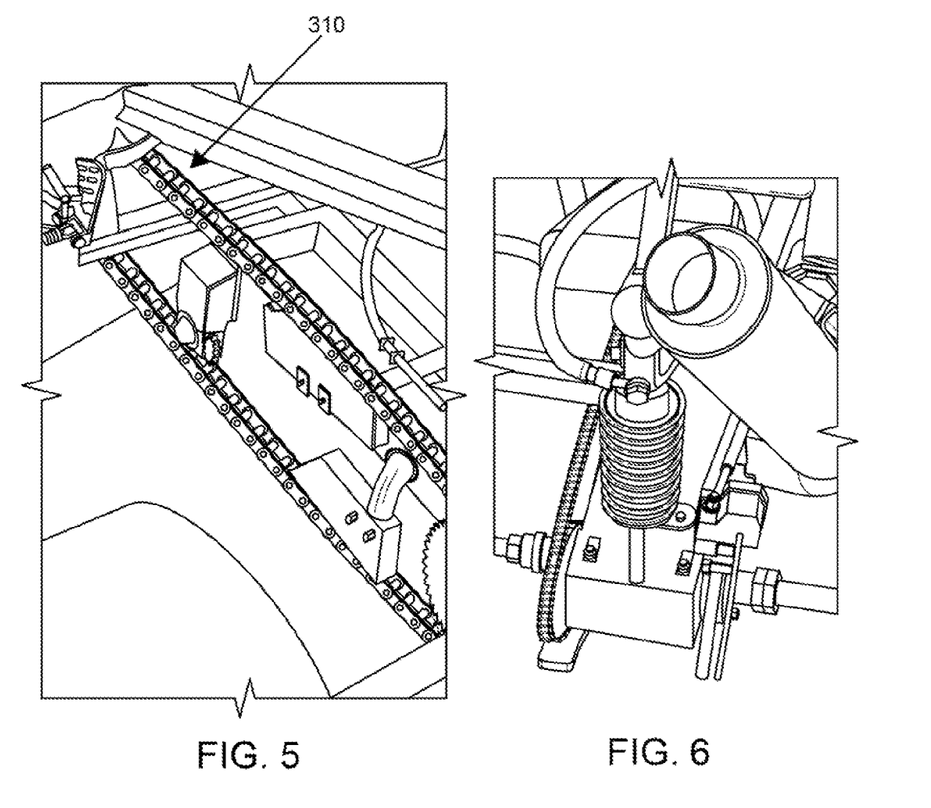
FIG. 5 shows a perspective view of the chain and sprocket of the present invention with tensioning guides.
FIG. 6 shows a rear view of the chain, the sprocket, and the mono-shock of the present invention.
Figure 7:
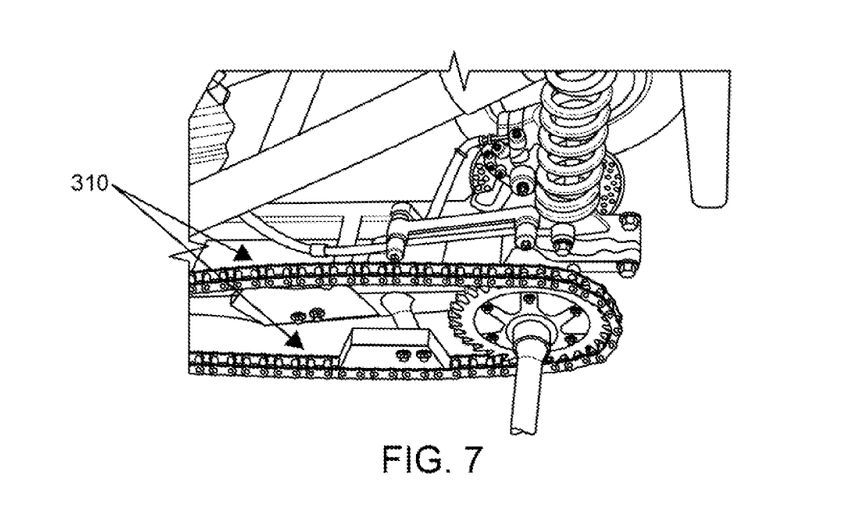
FIG. 7 shows a perspective view of the chain and sprocket of the present invention with tensioning guides.
Figures 8, 9:
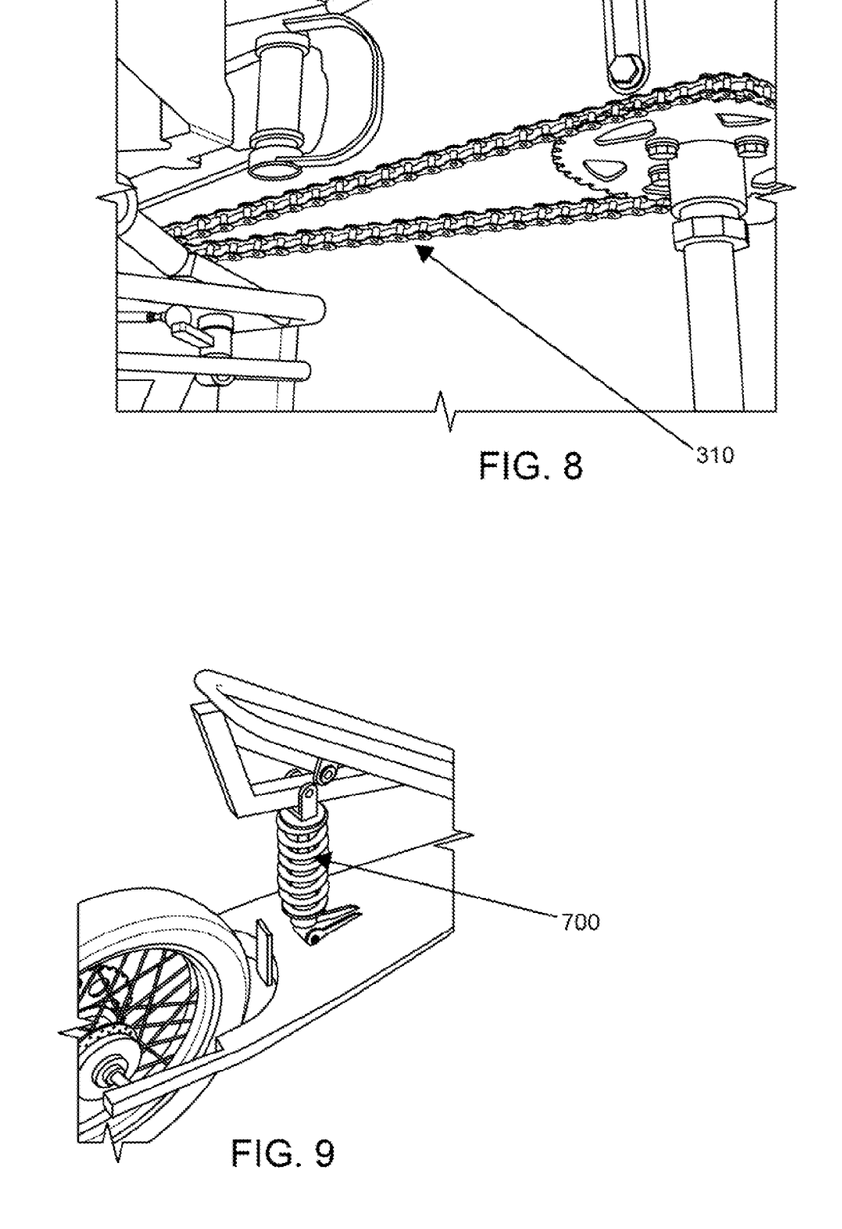
FIG. 8 shows a perspective view of the chain and sprocket of the present invention without tensioning guides.
FIG. 9 shows a perspective view of the present invention on a two-wheeled all-terrain vehicle.
Figure 10:
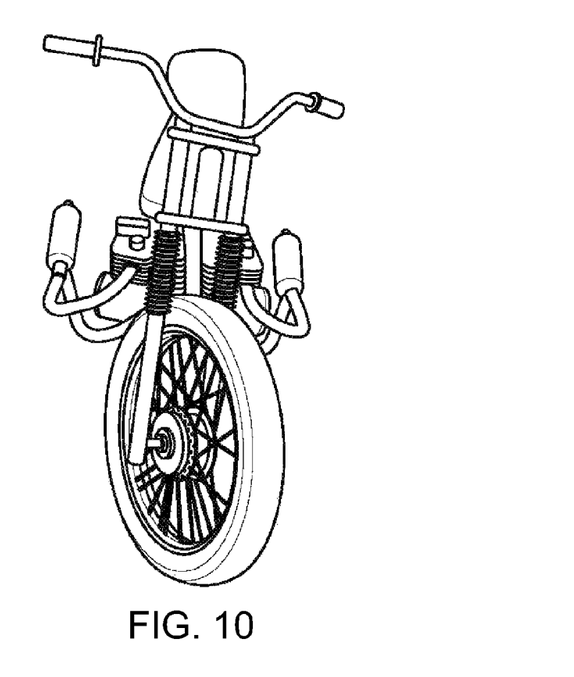
FIG. 10 shows a front view of the present invention on a two-wheeled all-terrain vehicle.
Figure 11:
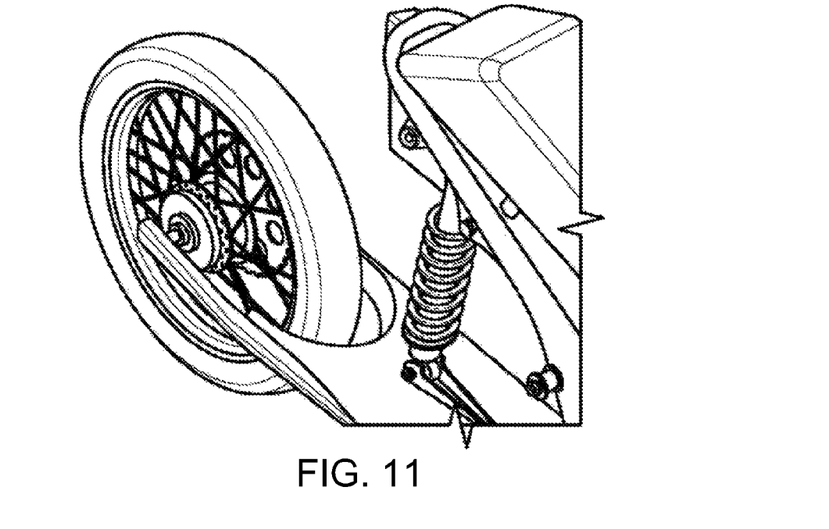
FIG. 11 shows a perspective view of the present invention on a two-wheeled all-terrain vehicle.
Figure 12:
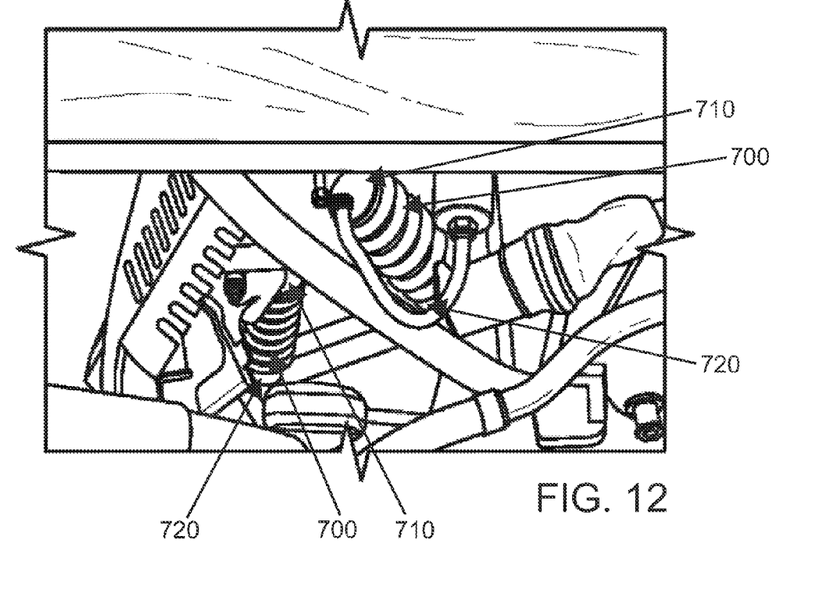
FIG. 12 shows a perspective view of the present invention on a three-wheeled all-terrain vehicle featuring a second mono-shock.
Figure 13:
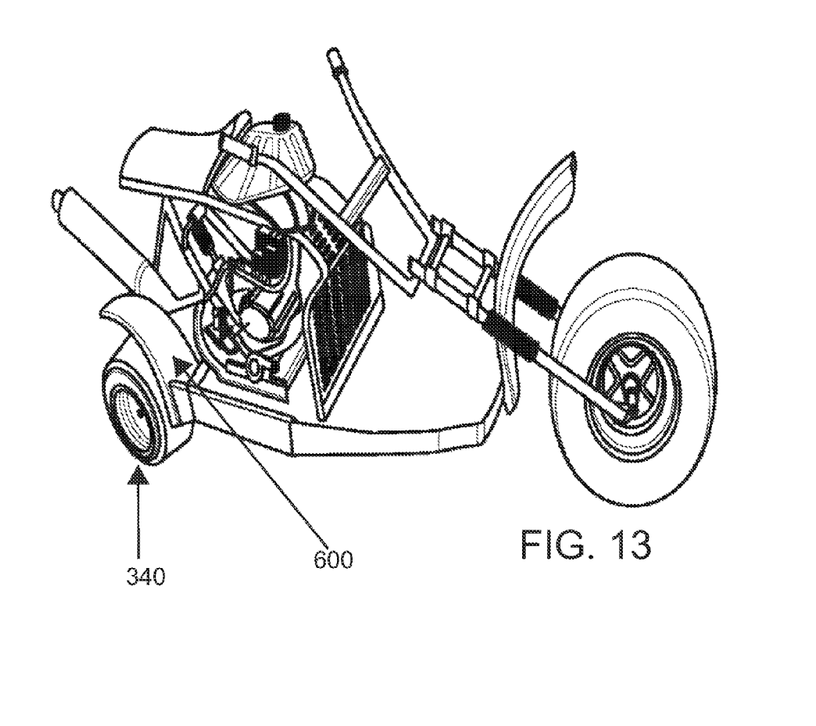
FIG. 13 shows a perspective view of the present invention on a three-wheeled all-terrain vehicle.

In some embodiments, a second mono-shock (700) is located between upper frame (200) and the lower frame swing arm (400). In some embodiments, the second mono-shock (700) comprises an angle opposite the angle of the first mono-shock (700). In some embodiments, the first mono-shock (700) and the second mono-shock (700) are used in conjunction with one another. In some embodiments, the first mono-shock (700) and the second mono-shock (700) are located opposed to one another on each side of a vertical plane. In some embodiments, the second mono-shock (700) is similar in angle to what is commonly found in the prior art and in industry. In some embodiments, the first mono-shock (700) faces an opposite direction mirrored in a vertical plane to what is commonly found in the prior art and in industry. In some embodiments, the second mono-shock (700) reduces the impact from bumps and help support the weight of a passenger. In some embodiments, the novel use of two mono-shocks (700) in the positions and angles described is unprecedented in the prior art.

In some embodiments, the mono-shock first end (710) can be attached in one of a series of locations to set the proper angle for optimum performance to harness the torque of the vehicle to keep the front wheels on the ground based on the preference of the rider.

In some embodiments, the mono-shock (700) is positioned above the rear axle (600). In some embodiments, the mono-shock (700) is positioned entirely anterior to the rear axle (600). In some embodiments, the mono-shock (700) is positioned entirely posterior to the rear axle (600).

In some embodiments, a second mono-shock first end (710) is located at the upper frame posterior end midpoint (272). In some embodiments, a second mono-shock second end (720) is located the lower frame anterior end (450). In some embodiments, a second mono-shock (700) lies in said Plane A (500). In some embodiments, the second mono-shock (700) is located at an angle in a Sagittal plane from 30 degrees to 90 degrees with respect to said Plane B (510). In some embodiments, the first mono-shock (700) and the second mono-shock (700) are used in conjunction with one another. In some embodiments, the first mono-shock (700) and the second mono-shock (700) are located opposed to one another on each side of a vertical plane located at the upper frame posterior end midpoint (272).

As used herein, the term " " refers to plus or minus 10% of the referenced number.

The disclosures of the following U.S. Patents are incorporated in their entirety by reference herein: U.S. Pat. Pub. No. 2007/0120303; U.S. Pat. Pub. No. 2006/0113743; U.S. Pat. Pub. No. 2003/0136613; U.S. Pat. No. 6,851,691; U.S. Pat. No. 6,786,526; U.S. Pat. No. 6,581,716; U.S. Pat. No. 6,164,673; U.S. Pat. No. 6,042,131; U.S. Pat. No. 5,845,918; U.S. Pat. No. 5,513,868; and U.S. Pat. No. 4,341,397.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A torque reversing suspension system (100) for improved traction and steering control for all-terrain vehicles, wherein said system (100) consists of:
   (a) an all-terrain vehicle upper frame (200) having an upper frame top (210), an upper frame bottom (220), an upper frame first side (230), an upper frame second side (240), an upper frame anterior end (250), an upper frame middle (260), and an upper frame posterior end (270), wherein the upper frame middle (260) is located between the upper frame anterior end (250) and the upper frame posterior end (270), wherein an all-terrain vehicle front steering and suspension system (280) is disposed at the upper frame anterior end (250), wherein an all-terrain vehicle engine and transmission (290) are disposed at the upper frame middle (260), wherein an all-terrain vehicle seat (300) is disposed on the upper frame top (210) proximal to the upper frame middle (260);
   (b) a single all-terrain vehicle lower frame swing arm (400) having a lower frame top (410), a lower frame bottom (420), a lower frame first side (430), a lower frame second side (440), a lower frame anterior end (450), and a lower frame posterior end (460), wherein the lower frame anterior end (450) is pivotally disposed on the upper frame bottom (220) posterior to the upper frame middle (260), wherein the vehicle lower frame swing arm (400) travels in a vertical plane, Plane A (500),
wherein said Plane A (500) lies on an upper frame anterior end midpoint (252) and an upper frame posterior end midpoint (272), wherein the upper frame anterior end midpoint (252) is located between the upper frame first side (230) and the upper frame second side (240) on the upper frame anterior end (250), wherein the upper frame posterior end midpoint (272) is located between the upper frame first side (230) and the upper frame second side (240) on the upper frame posterior end (270);
   (c) a rear axle (600) having a rear axle midpoint (610) disposed at a lower frame posterior end midpoint (462), wherein the lower frame posterior end midpoint (462) is located between the lower frame first side (430) and the lower frame second side (440) on the lower frame posterior end (460): wherein the rear axle midpoint (610) is located between a rear axle first side (620) and a rear axle second side (630), wherein the rear axle (600) is operatively connected to the engine and transmission (290) via a chain (310) and sprockets (320), wherein a rear wheel (330) having a rear tire (340) disposed thereon is disposed on the rear axle (600), wherein the rear axle (600) travels in said Plane A (500); and
   (d) a first mono-shock (700) having a first mono-shock first end (710) and a first mono-shock second end (720), wherein the first mono-shock first end (710) is disposed at the upper frame posterior A end midpoint (272), wherein the first mono-shock second end (720) is disposed at the lower frame posterior end midpoint (462), wherein the lower frame posterior end midpoint (462) is located between the lower frame first side (430) and the lower frame second side (440) at the lower frame posterior end (460), wherein the first mono-shock (700) lies in said Plane A (500);
wherein a horizontal plane, Plane B (510), is horizontally disposed and intersects a front wheel center, and a rear wheel center, wherein a vertical plane, Plane C (520), is vertically perpendicularly disposed with respect to said Plane B (510), wherein said Plane C (520) intersects a rear-most tangent of the rear tire (340), wherein said Plane A (500) is perpendicular to said Plane B (510) and said Plane C (520), wherein the upper frame posterior end (270) is disposed at or posterior to said Plane C (520);
wherein the first mono-shock (700) is disposed at an angle in said Plane A from 30 degrees to 75 degrees with respect to said Plane B (510), wherein the location of the first mono-shock first end (710) and the mounting angle of the first mono-shock (700) of the torque reversing suspension system (100) prevents lifting of the front tire (340) for improved traction and steering control for the all-terrain vehicle upon operation;
wherein a second mono-shock first end (710) is disposed at the upper frame posterior end midpoint (272), wherein a second mono-shock second end (720) is disposed at the lower frame anterior end (450), wherein a second mono-shock (700) lies in said Plane A (500), wherein the second mono-shock (700) is disposed at an angle in said Plane A from 30 degrees to 90 degrees with respect to said Plane B (510), wherein the first mono-shock (700) and the second mono-shock (700) are used in conjunction with one another, wherein the first mono-shock (700) and the second mono-shock (700) are disposed opposed to one another on each side of a vertical plane located at the upper frame posterior end midpoint (272).

2. The system of claim 1, wherein the system (100) is disposed on a four-wheeled all-terrain vehicle.

3. The system of claim 1, wherein the system (100) is disposed on a three-wheeled all-terrain vehicle.

4. The system of claim 1, wherein the system (100) is disposed on a two-wheeled all-terrain vehicle.

* * * * *